United States Patent
Kelmer et al.

(10) Patent No.: US 6,260,389 B1
(45) Date of Patent: Jul. 17, 2001

(54) METHOD OF PRETHREADING A FIBER DRAW PROCESS

(75) Inventors: Kenneth J. Kelmer; Douglas E. McElheny, both of Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/337,700

(22) Filed: Jun. 21, 1999

Related U.S. Application Data

(60) Provisional application No. 60/093,395, filed on Jul. 20, 1998.

(51) Int. Cl.$^7$ .................................................. C03B 37/025
(52) U.S. Cl. .................................. 65/407; 65/409; 65/435
(58) Field of Search .............................. 65/435, 385, 407, 65/409

(56) References Cited

U.S. PATENT DOCUMENTS

| | | | |
|---|---|---|---|
| 4,486,212 | * 12/1984 | Berkey . | |
| 4,932,740 | 6/1990 | Berkey et al. | 350/96.15 |
| 5,131,735 | 7/1992 | Berkey et al. | 385/43 |
| 5,134,470 | 7/1992 | Ravetti | 385/98 |
| 5,249,246 | 9/1993 | Szanto | 385/96 |
| 5,674,306 | 10/1997 | Hoshino et al. | 65/385 |
| 5,745,626 | 4/1998 | Duck et al. | 385/96 |

FOREIGN PATENT DOCUMENTS 58-211709 * 12/1983 (JP) ...................................... 65/409

* cited by examiner

Primary Examiner—John Hoffmann
(74) Attorney, Agent, or Firm—Robert L. Carlson; Randall S. Wayland

(57) ABSTRACT

A method for threading a lead end of a fiber through the drawing apparatus of a fiber draw process. A prethread filament is fed through the apparatus of a draw process. One end of the prethread filament is then attached to the lead end of the fiber and used to pull the fiber through the apparatus of the draw process.

13 Claims, 2 Drawing Sheets

METHOD OF PRETHREADING A FIBER DRAW PROCESS

This application claims benefit of Provisional Application Ser. No. 60/093,395 filed Jul. 20, 1998.

FIELD OF THE INVENTION

The present invention relates to a method of making an optical fiber, more particularly to a method of prethreading a fiber through the apparatus employed to draw said fiber in a fiber draw process.

BACKGROUND OF THE INVENTION

Optical fiber is commonly made in a manufacturing process in which fiber is drawn from a glass preform into a thin strand of fiber many kilometers long. In most, if not all of these processes, this process begins with lowering a fiber preform into a furnace and heating it to a temperature sufficient to make the lower end of the preform sag into a gob. As the temperature of the lower end of the preform increases, this gob continues to narrow in diameter until it is sufficiently thin, and the viscosity of the glass is sufficiently low, to enable a strand of fiber to be continuously pulled from the preform.

The beginning of this process thus commonly involves threading the leading end of the fiber through the various apparatus employed in the fiber draw process, e.g., a fiber coating system for applying a protective coating onto the fiber, a fiber cooling system if one is employed, and various diameter measurement devices. The fiber is then attached to a device known as a tractor which continuously pulls the fiber through the draw apparatus, after which it is wound onto spools.

One way of accomplishing the initial task of threading the lead end of the fiber through the draw apparatus is to have the fiber manually thinned by a worker and then manually threaded down the draw tower and through the fiber cooling and coating systems, etc. During this process, the fiber often must be broken multiple times to maintain the proper diameter. In addition, the fiber often breaks by accident. In either case, the process of threading the fiber can become quite tedious and time consuming. In addition, stray fiber from this breakage often ends up in the cooling and/or coating systems, and can become a source of abrasions during the manufacturing process. If this occurs, it is often not detectable until after all of the fiber is drawn, in which case an entire spool of fiber may have to be scrapped. The difficulty with this process is magnified by the fact that these apparatus often occur on different floors of the manufacturing facility, and thus require more than one manual worker to thread the fiber through the apparatus. It is also magnified by the inconsistency from worker to worker in how the glass is thinned and the appropriate fiber diameter is determined prior to beginning the threading process. Adequately judging the proper fiber diameter can be crucial to the successful threading of the beginning of the draw process. Because of all the difficulties in manually threading the fiber by hand through the process, this process can sometimes take as long as 30 minutes or more to complete.

It would therefore be desirable to design an alternative method for feeding the leading edge of a fiber through the various apparatus of the draw process.

SUMMARY OF THE INVENTION

One aspect of the present invention relates to a method of threading a fiber in an optical fiber draw process, wherein a prethread filament is fed through the fiber draw process, the fiber is attached to the prethread filament, and the fiber is pulled through the process using the prethread filament. This method thus involves prethreading the filament through at least one component of the fiber draw process.

In one embodiment, one end of the prethread filament is fed through the component, and the other end of the prethread filament is fed into a coupling sleeve. The other end of the coupling sleeve is then used to capture the lead end of the fiber to be drawn from the preform. The lead end of the fiber can then be fed through the system simply by pulling the prethread filament back through the system.

There are a variety of materials that could be employed as the coupling sleeve. For example, conventional shrink tubing materials could be employed, as could adhesives or glues. Traditional glass splicing techniques (e.g., glass butt splicing techniques) could be employed if the prethread material is glass (e.g. glass fiber). Alternatively, a thin walled metal tube could be employed by crimping both ends of the metal tube about the lead end of the fiber and the trailing end of the prethread material. Alternatively, non-shrink tubes (e.g. tubes made of polyimide or polyester) could be employed, in which case the ends of the fiber and prethread could be attached therewith using glues to couple both ends inside the non-shrink tubes. In all of these embodiments, the outside diameter of the coupling sleeve is preferably narrow enough to fit through the various components of the fiber draw process, especially the coating applicator devices.

There are a variety of materials that could be employed as the filament. For example, metal wire, polyester filament, glass fiber (e.g. fiber optic filament), plastic materials, nylon and other materials could be employed successfully.

Coupling of the fiber to the prethread filament by the coupling sleeve can be achieved in a variety of methods, for example, melting or shrinking the coupling sleeve, melting both the sleeve and the filament, or melting only the filament. If desired, a glue or adhesive can be employed inside the coupling sleeve to join the ends of the prethread filament to the fiber.

Using the method of the present invention, threading of the lead end of the fiber in a draw process has been greatly facilitated. The time required for threading of the lead end of the fiber is greatly reduced, from a time which used to sometimes take as long as one half hour or longer, to a process which now takes minutes or less, once the proper diameter fiber is achieved. In addition, the quality of the resultant fiber is greatly improved, because the amount of broken fiber, which can, and often does end up in a location which could scratch the fiber, does not occur.

DETAILED DESCRIPTION OF THE INVENTION

Figure 1:
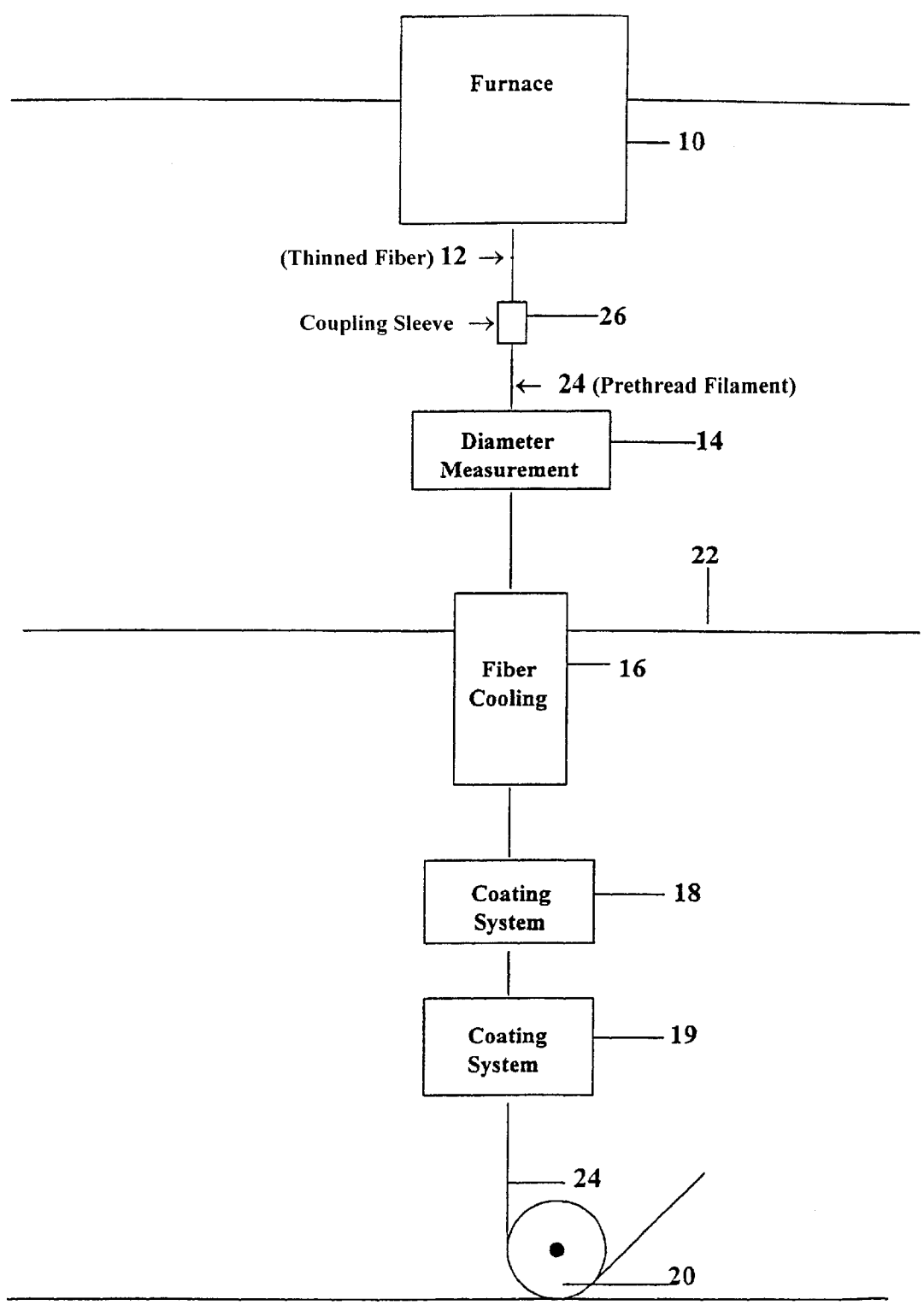
FIG. 1 illustrates a fiber draw process in accordance with the invention.

Referring to FIG. 1 a fiber draw process is illustrated in which a furnace 10 is employed to heat an optical preform so that a fiber 12 can be drawn therefrom. At the beginning of the fiber draw process, this fiber 12 must be fed through a variety of apparatus, e.g., a diameter measurement device 14, a fiber cooling tube 16, and often two or more coating systems 18 and 19. The fiber is then eventually drawn up onto a tractor 20 which pulls the fiber through the various manufacturing apparatus. After being pulled by the tractor, the fiber is wound onto a spool (not shown).

This prethreading operation is further complicated by the fact that the various apparatus can be separated by a floor structure (e.g. illustrated here as structure 22).

In one embodiment of the present invention, a prethread filament 24 is fed through the fiber draw apparatus prior to the lead end of the fiber 12. Preferably, the prethread filament 24 is fed downwardly through the apparatus to take advantage of gravity. For example, if the internal diameter of the particular apparatus through which the filament is being fed is wide enough, a weight can be attached to the prethread filament to facilitate threading. This is usually the case with the diameter measurement and fiber cooling devices. However, because of the narrow internal diameter of the coating systems, bare fiber must be fed through these devices.

Consequently, in one embodiment, a weight is attached to the prethread filament by an operator on the upper floor and fed through the diameter measurement device 14 and fiber cooling device 16. An operator stationed below the floor 22 then removes the weight from the prethread filament 24, and threads it through coating systems 18 and 19, respectively.

The prethreading operation can be done, for example, while a new fiber preform is being inserted into the furnace, or while the fiber preform is being preheated to a temperature sufficient to draw a fiber therefrom. Then, once the fiber exiting from the furnace is of a sufficiently thin diameter for attachment to the prethread filament 24, (this diameter is typically on the order of 80 to 200 microns) the lead end of the fiber 12 can be attached to the trailing end of the prethread filament 24, as illustrated in FIG. 1.

Figure 2:
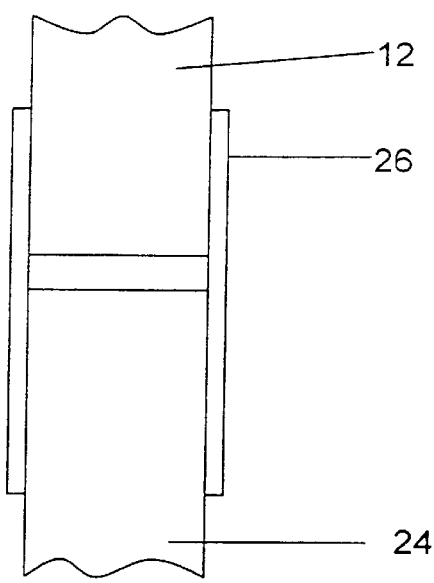
FIG. 2 is an enlarged cross-sectional view of the filament, fiber and coupling sleeve assembly illustrated in FIG. 1.

This can be done, for example, using a coupling sleeve 26, shown in more detail in FIG. 2. Preferred fiber coupling materials include the following materials which can be purchased in tubular form: polyester shrink tubing, polyimide, stainless steel, plastic materials, and polyester (non-shrink). The coupling sleeve 26 is preferably of a diameter which is sufficiently narrow to fit through all of the internal diameters of the various apparatus in the fiber draw process, especially the fiber coating systems. One particularly difficult area for fiber threading has been the coating systems. These coating systems typically include irradiator tube (which enable radiation curing of the coatings) having orifices with internal diameters as small as 25 mm or less, and coating dies having internal diameters as small 15 mils (about 380 microns) or less.

Polyester can be employed as shrink tube material which can be collapsed around the lead end of the fiber and the trailing end of the prethread via heating. Stainless steel can be employed as a thin-walled tube, the ends of which may be crimped about the ends of the fiber and prethread. Polyimide and Polyester tubes are preferably employed as receptacles for joining the ends of the fiber and prethread via glue or adhesives.

One particularly preferred sleeve material is polyimide, which has a melting point of about 1100°–1200° F. One particularly preferred polyimide tubing is a 180 micron ID tubing obtainable from HV Technologies in Atlanta, Ga., USA.

The prethread filament 24 can be constructed of a variety of materials. One preferred material is nylon. Another is polyester, which has a melting point of about 500° F.

For example, a strand of polyester fiber approximately 150 microns can be employed with the polyimide tubing mentioned above which has an internal diameter of 180 microns. The fiber is preferably drawn down to a diameter of about 150 microns or less prior to feeding into the fiber coupling sleeve 26.

Figure 3:
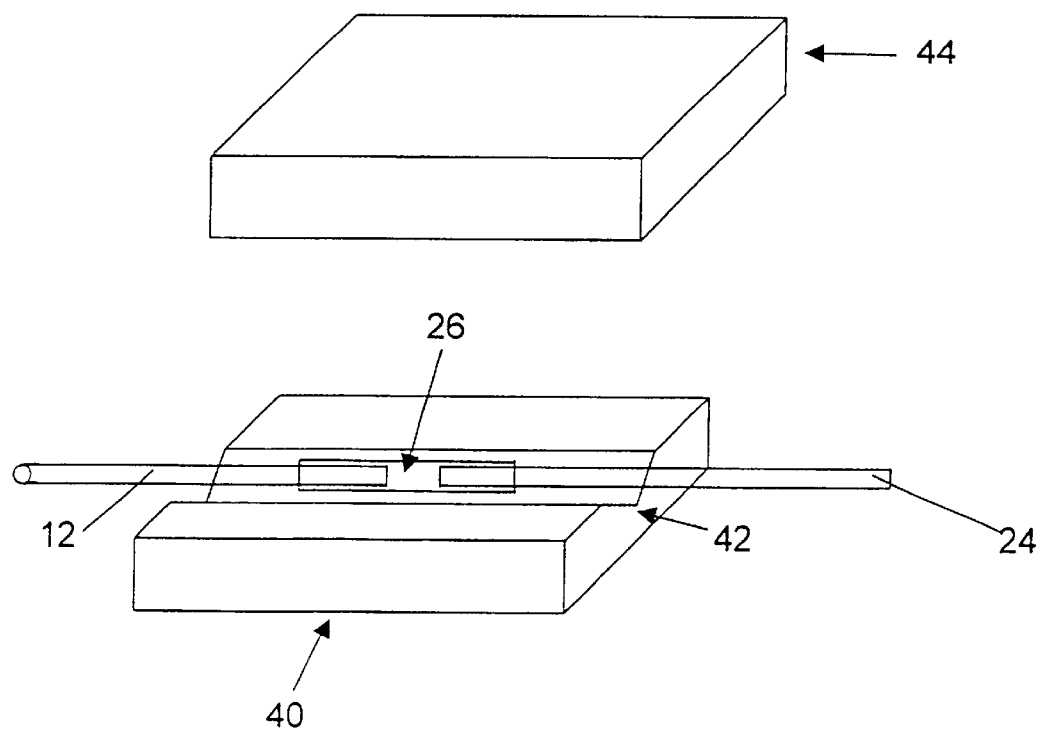
FIG. 3 is a perspective view illustrating an alignment device for facilitating coupling of the fiber to the filament.

The fiber-to-filament attachment process can be facilitated by the use of a device to help guide the ends of the fiber into the coupling sleeve 26. Such a device is illustrated in FIG. 3. In this apparatus, a lower plate 40 comprises a groove 42 therein which is deep enough to receive and align each of the filament, fiber, and coupling sleeve. In one embodiment, the polyimide sleeve 26 is placed in the center of the groove 42, and upper plate 44 is placed over lower plate 40. The prethread filament 24 is then inserted into one end of the groove 42, and the lead end of fiber 12 is inserted into the other end of groove 42. The plates 44 and 40 can then be heated to melt either or both of the coupling sleeve 26 or prethread filament 24. Alternatively, if desired, the sleeve 26 and preassembly, which includes the fiber 12 and prethread filament 24, can be removed from the alignment device and appropriately fused together after removal therefrom. Because the polyimide has a higher melting point than the polyester prethread filament, one method which employs these two materials is to heat (e.g. via hot air blown from a heat gun or direct contact like with a device such as a soldering iron) the polyester prethread filament to a temperature above its melting point (e.g., greater than 500° F.). The heated end of the polyester filament thus melts, and upon solidifying attaches itself to both the polyimide coupling sleeve 26 and the lead end of optical fiber 12.

In one preferred embodiment, the splicing process involves two steps. The first step involves bonding a polyester prethread line to a polyimide tubing. The polyester is inserted into the tubing and heated to greater than 500° F., which adheres the polyester filament to the tubing. This step can occur, for example, prior to or during the loading of the preform for the glass optical fiber in the furnace, so there is no time constraint. This step typically takes about 15 seconds.

The second step occurs after the glass has been sufficiently thinned, preferably to a thickness which will enable it to be pulled through the various components of the fiber draw process. The polyester filament that resides inside the tubing can be heated prior to inserting the fiber into the coupling sleeve by placing a heater directly onto the tubing. The heater can consist of, for example, a hot air gun, in which case hot air of a sufficiently high temperature to melt or soften the coupling sleeve material is directed towards the coupling sleeve. Of course, alternative devices, such as a soldering iron or similar contact-heating device, could be employed to heat the coupling sleeve. This preheating step can be done very quickly because polyester melts within seconds. The fiber can then be inserted at any time while the polyester remains in fluid form. It typically takes 2 to 4 seconds to insert the fiber into the coupling sleeve. As soon as the heat is removed from the coupling sleeve the polyester solidifies and adheres itself to the fiber. The solidification step can take up to 5 seconds to complete. The entire operation of connecting the lead end of the fiber to the coupling sleeve (which was connected to the prethread earlier) typically takes from 10 to 15 seconds.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of threading of fiber in an optical fiber draw process comprising:

feeding a prethread filament through at least one component of said process;

attaching said prethread filament to said fiber; and pulling said fiber through said at least one component using said filament so that said fiber extends through said at least one component and said filament does not extend through said at least one component.

2. The method of claim 1, wherein said feeding step occurs subsequent to said attaching step.

3. The method of claim 1, wherein said at least one component is downstream of a fiber draw furnace.

4. The method of claim 1, wherein said attaching step comprises inserting one end of said fiber into one end of a coupling sleeve, and said prethread filament into the other end of said coupling sleeve.

5. The method of claim 4, further comprising melting said coupling sleeve.

6. The method of claim 4, further comprising melting said filament.

7. The method of claim 6, wherein said melted filament attaches to said fiber inside said sleeve.

8. The method of claim 4, further comprising melting said sleeve and said filament.

9. The method of claim 4, wherein said sleeve comprises a material selected from the group consisting of polyimide, polyester, and plastic.

10. The method of claim 4, wherein said prethread filament comprises:

a material selected from the group consisting of metal, nylon, polyester, plastic, and glass.

11. The method of claim 1, wherein said at least one component in said feeding step includes at least a coating applicator device.

12. The method of claim 11, wherein said coating applicator device comprises a coating die having an internal diameter therein which is less than 25 mm, and said prethread filament is fed through said internal diameter.

13. The method of claim 1, further comprising attaching said filament to a tractor which pulls said fiber through said fiber draw apparatus.

* * * * *